US012645467B2

(12) United States Patent
Jeran et al.

(10) Patent No.: US 12,645,467 B2
(45) Date of Patent: Jun. 2, 2026

(54) METHOD AND MEDIUM FOR AUTHENTICATING A REPLACEABLE SUPPLY COMPONENT, AND REPROCESSING THE REPLACABLE SUPPLY COMPOENT TO RECONGIGURE AN END-USER DEVICE

(71) Applicant: HEWLETT-PACKARD DEVELOPMENT COMPANY, L.P., Spring, TX (US)

(72) Inventors: Paul L Jeran, Boise, ID (US); Jesse Otto Sutherland, III, Vancouver, WA (US); Kyle Michel, Vancouver, WA (US); Gabriel Scott Mcdaniel, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 43 days.

(21) Appl. No.: 18/276,586

(22) PCT Filed: Feb. 12, 2021

(86) PCT No.: PCT/US2021/017918
§ 371 (c)(1),
(2) Date: Aug. 9, 2023

(87) PCT Pub. No.: WO2022/173444
PCT Pub. Date: Aug. 18, 2022

(65) Prior Publication Data
US 2024/0118906 A1 Apr. 11, 2024

(51) Int. Cl.
*G06F 9/00* (2018.01)
*G06F 9/445* (2018.01)
*G06F 21/57* (2013.01)

(52) U.S. Cl.
CPC ........ *G06F 9/44505* (2013.01); *G06F 21/572* (2013.01)

(58) Field of Classification Search
CPC ....... G06F 9/44505; G06F 21/572; G06F 9/00
See application file for complete search history.

(56) References Cited

U.S. PATENT DOCUMENTS 7,440,808 B2 * 10/2008 Koichi ............... G03G 15/0863
399/24
8,554,090 B2 * 10/2013 Cachia ................. B41J 2/17546
399/110

(Continued)

FOREIGN PATENT DOCUMENTS

| GB | 2487363 A | 7/2012 |
| WO | 2014/109416 A1 | 7/2014 |
| WO | 2014/141139 A1 | 9/2014 |

*Primary Examiner* — Tammara R Peyton
(74) *Attorney, Agent, or Firm* — Michael Dryja

(57) ABSTRACT

An example method comprising requesting authorization to reprocess a replaceable supply component using an interface and original manufacturing data stored in memory of the replaceable supply component. The method further comprises, in response to the request, receiving configuration data using the interface, and appending the original manufacturing data with the configuration data to designate the replaceable supply component as reprocessed, wherein the configuration data is to cause reconfiguration of an end-user device in response to attachment of the replaceable supply component to the end-user device and execution by the end-user device.

13 Claims, 7 Drawing Sheets

(56)     References Cited

U.S. PATENT DOCUMENTS

| | | | |
|---|---|---|---|
| 8,554,958 | B1 | 10/2013 | Weiser et al. |
| 8,602,536 | B1 | 12/2013 | Sarnoff et al. |
| 9,519,449 | B2 | 12/2016 | Thacker et al. |
| 9,630,417 | B2 * | 4/2017 | Campbell-Brown ........................ B41J 2/1753 |
| 10,386,746 | B2 * | 8/2019 | Jeran ..................... G06F 3/0629 |
| 11,429,366 | B2 * | 8/2022 | Kim ..................... H04L 9/3236 |
| 11,590,763 | B2 * | 2/2023 | Castano Aspas ...... C09D 11/30 |
| 11,768,643 | B2 * | 9/2023 | Gremaud .............. G06F 3/1239 358/1.15 |
| 2005/0008376 | A1 | 1/2005 | Parry et al. |
| 2013/0099899 | A1 | 4/2013 | Thacker, III et al. |
| 2020/0282735 | A1 | 9/2020 | Jeran et al. |

* cited by examiner

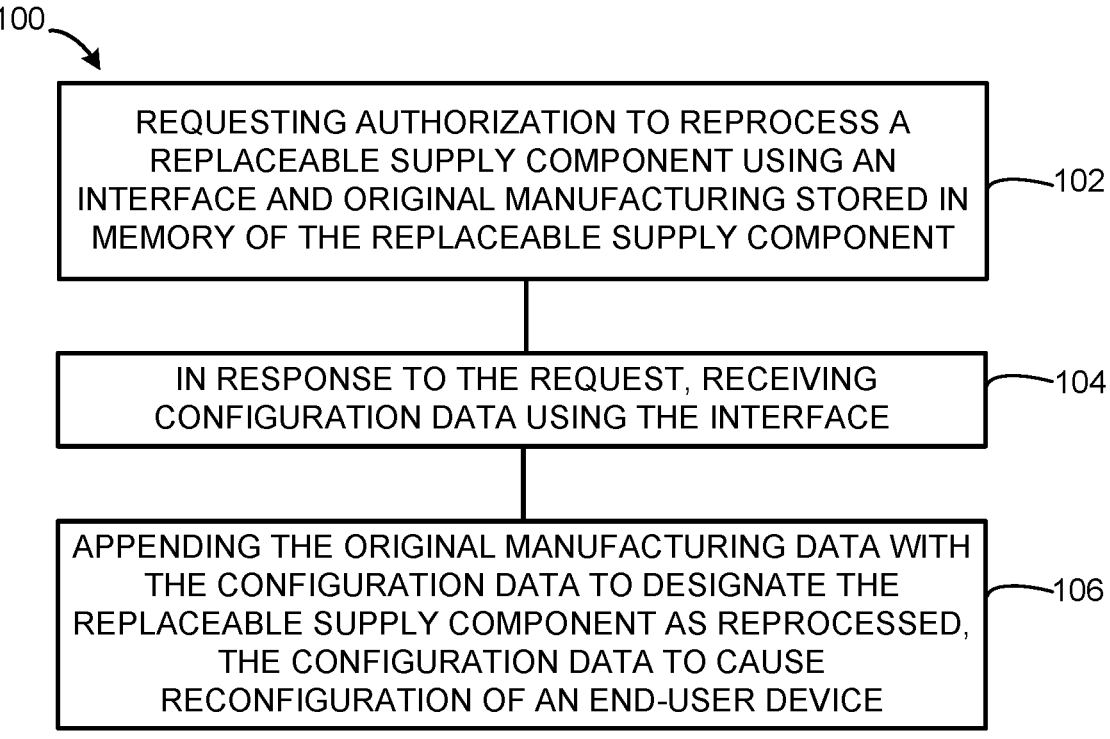

100

REQUESTING AUTHORIZATION TO REPROCESS A REPLACEABLE SUPPLY COMPONENT USING AN INTERFACE AND ORIGINAL MANUFACTURING STORED IN MEMORY OF THE REPLACEABLE SUPPLY COMPONENT ─102

IN RESPONSE TO THE REQUEST, RECEIVING CONFIGURATION DATA USING THE INTERFACE ─104

APPENDING THE ORIGINAL MANUFACTURING DATA WITH THE CONFIGURATION DATA TO DESIGNATE THE REPLACEABLE SUPPLY COMPONENT AS REPROCESSED, THE CONFIGURATION DATA TO CAUSE RECONFIGURATION OF AN END-USER DEVICE ─106

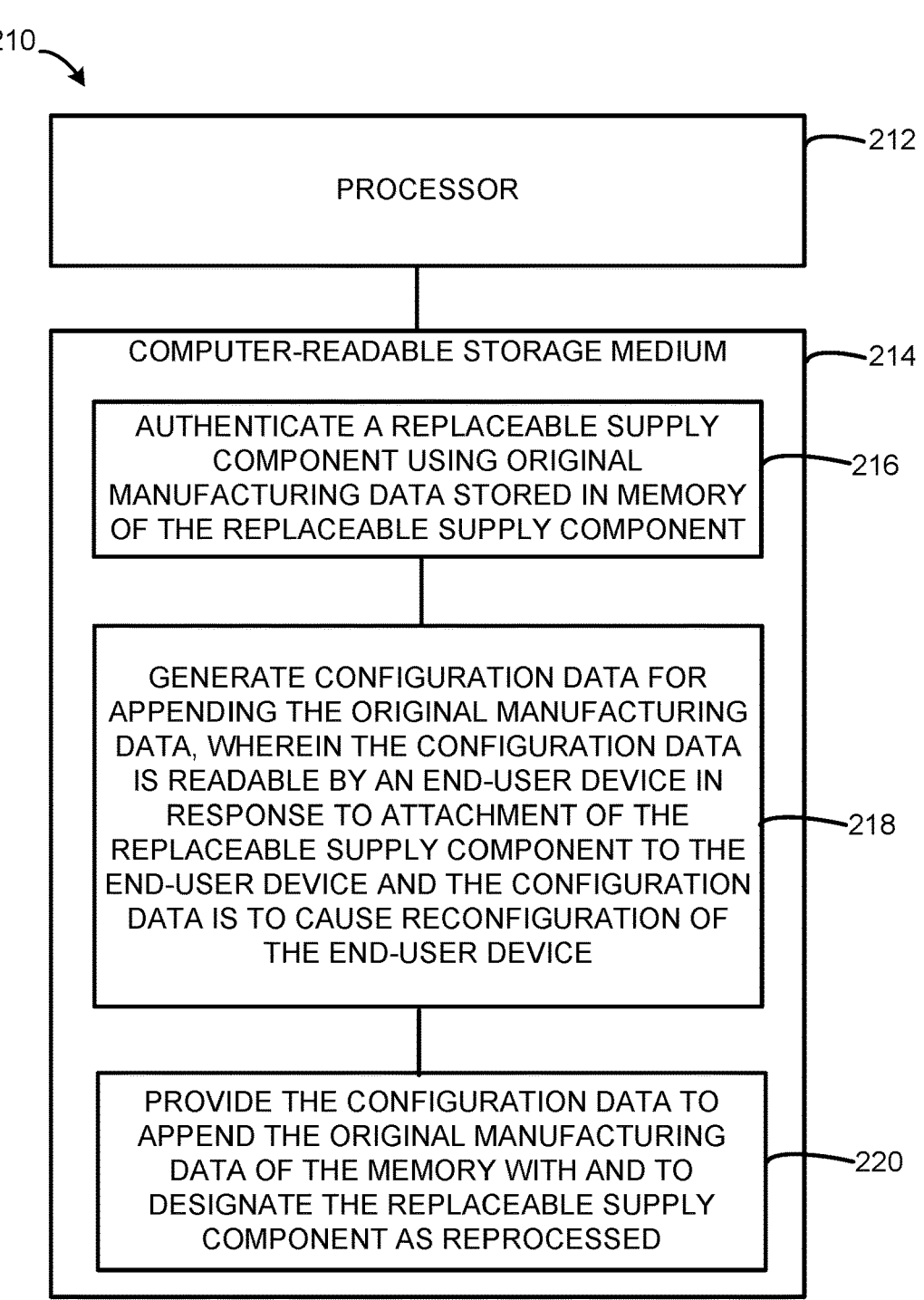

212

PROCESSOR

214

COMPUTER-READABLE STORAGE MEDIUM

216

AUTHENTICATE A REPLACEABLE SUPPLY COMPONENT USING ORIGINAL MANUFACTURING DATA STORED IN MEMORY OF THE REPLACEABLE SUPPLY COMPONENT

218

GENERATE CONFIGURATION DATA FOR APPENDING THE ORIGINAL MANUFACTURING DATA, WHEREIN THE CONFIGURATION DATA IS READABLE BY AN END-USER DEVICE IN RESPONSE TO ATTACHMENT OF THE REPLACEABLE SUPPLY COMPONENT TO THE END-USER DEVICE AND THE CONFIGURATION DATA IS TO CAUSE RECONFIGURATION OF THE END-USER DEVICE

220

PROVIDE THE CONFIGURATION DATA TO APPEND THE ORIGINAL MANUFACTURING DATA OF THE MEMORY WITH AND TO DESIGNATE THE REPLACEABLE SUPPLY COMPONENT AS REPROCESSED

HOUSING

ELECTRONIC CIRCUITRY — 319

REPLACEABLE SUPPLY COMPONENT — 321

MEMORY — 323

311 — ORIG. MANUF. DATA

CONFIG. DATA — 313

METHOD AND MEDIUM FOR AUTHENTICATING A REPLACEABLE SUPPLY COMPONENT, AND REPROCESSING THE REPLACABLE SUPPLY COMPOENT TO RECONGIGURE AN END-USER DEVICE

BACKGROUND

Various types of devices include replaceable supply components, such as inkjet printhead assemblies, and print material containers for two-dimensional (2D) or three-dimensional (3D) printing devices, for example. Example print material containers include inkjet cartridges, toner cartridges, ink supplies, and build material supplies, among others. In some cases, such supply components include integrated circuits, which may be referred to as chips, to communicate with electronic circuitry of the device in which they are installed. While replaceable supply components may be relevant to printing, replaceable supply components may be used in other contexts, such as in the field of biomedical devices for testing fluids and fluid dispensing and/or other material dispensing devices, such as filtered-water dispensers in a refrigerator.

BRIEF DESCRIPTION OF THE DRAWINGS

FIG. 1 illustrates an example method for reprocessing a replaceable supply component to reconfigure an end-user device, in accordance with examples of the present disclosure.

FIG. 2 illustrates an example device including non-transitory computer-readable storage medium, in accordance with examples of the present disclosure.

DETAILED DESCRIPTION

Figure 3:
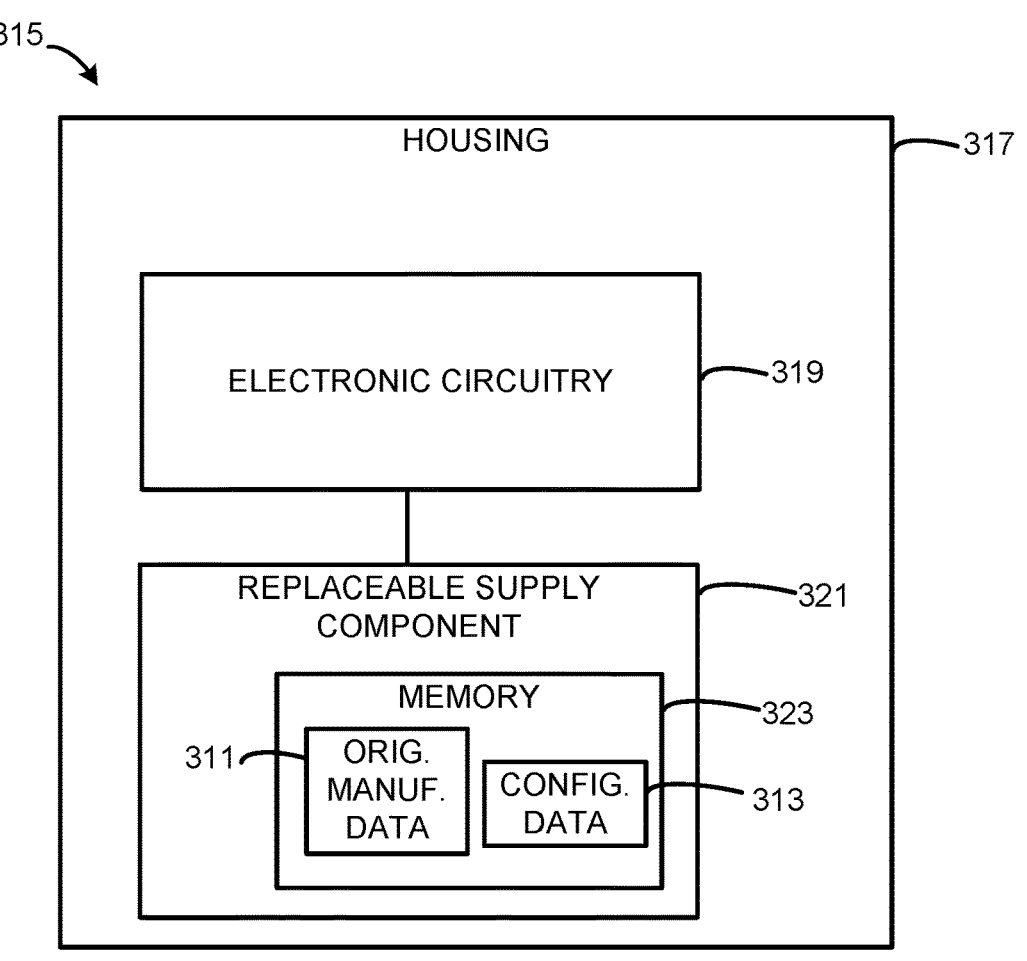
FIG. 3 illustrates an example end-user device, in accordance with examples of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Various types of end-user devices include replaceable supply components, such as 2D and 3D printing devices. Example 2D and 3D printing devices include inkjet printers, dry toner printers, liquid toner printers, and 3D powder bed inkjet printers. Example replaceable supply components include any number of print material containers, such as ink tanks, ink bottles, inkjet printhead cartridges, dry toner reservoirs, liquid toner reservoirs, dry toner cartridges, and build material supplies; and other components that may or may not contain print materials, such as printheads (e.g., a thermal inkjet printhead), long life consumables, imaging units, drums, and developers, among others. Other example devices include fluidic dispensing devices used to eject material onto a medium, such as paper, onto a layer of powered-based build material, or onto a reactive device or another substrate, which may be used for a biologic or chemical assay, and/or for filtering and dispensing fluid such as a water dispenser. The replaceable supply component has memory, such as memory of a chip, to communicate with electronic circuitry of the device in which the replaceable supply component is attached to. For security and other purposes, the memory and/or chip may be tamper-resistant so that the memory and other components of a chip may not be easily modified. For example, portions of the memory may be non-reprogrammable. In some examples, all of the memory may be non-reprogrammable. In some examples, portions of the memory may be programmable in certain ways, such as based on set rules.

Manufacturers or other authorized entities may provide data updates to end-user devices using replaceable supply components. In some instances, the update may occur after the replaceable supply components are manufactured. For example, after the replaceable supply components leave the factory, the manufacturer may perform a security update. In another example, a remanufacturer may refill already-used replaceable supply components with supply, and the manufacturer may want to change a behavior of the replaceable supply component or the end-user device using new data written to the replaceable supply component. As noted above, to provide security, the memory on the replaceable supply components have limited reprogrammability. For example, fraudulent and/or counterfeit products may deceive the end-user device and provide a security risk and/or provide a lower quality experience for the end user as compared to an authentic replaceable supply component, such as causing the end-user device to exhibit loss of functionality. As an example, with a printing device, the printing device may not provide the user with a notification of the ink fill level or a warning when the ink level is low when using a replaceable supply component that is reprocessed or remanufactured. In some examples, end-user device manufacturers may design end-user devices to accept supply components manufactured or reprocessed by approved entities, and to reject the replaceable supply components manufactured or reprocessed by others.

Examples in accordance with the present disclosure are directed to appending, such as adding and/or modifying, data to memory of a replaceable supply component to designate the replaceable supply component as reprocessed. The data is appended to the memory in a secure manner, such that an end-user device may authenticate the appended data as originating from an authorized source and in response to the authentication, the appended data may cause reconfiguration of the end-user device. In some examples, as the appended data is stored in non-volatile memory, the end-user device may authenticate the appended data and may be reconfigured using the appended data whether or not the end-user device is network connected.

In various examples, the data appended in the memory may include an update for an end-user device, such as a security update that occurred after the replaceable supply component is manufactured and before the replaceable supply component is attached to the end-user device. The data appended may be used to improve security, change device services, and/or change other replaceable supply component behavior or end-user device behavior.

Turning now to the figures, FIG. 1 illustrates an example method for reprocessing a replaceable supply component to reconfigure an end-user device, in accordance with examples of the present disclosure. The method 100 may be implemented by an encoding device in various examples.

At 102, the method 100 includes requesting authorization to reprocess a replaceable supply component using an interface and original manufacturing data stored in memory of the replaceable supply component. The original manufacturing data may include permanent programming data that is non-reprogrammable and/or data fields which may be changed in a specific manner. For example, certain data fields may be changed in the specific manner and once set, may not be converted back. In some examples, the original manufacturing data includes original equipment manufacturer (OEM) data of memory and/or a chip of the replaceable supply component.

In some examples, the request may include supply data and the original manufacturing data. The supply data may include data indicative of prior use of the replaceable supply component, such as supply size or fill level, ejection or other use times, such as a date of first installation or other attachment into the end-user device, and/or pages printed, among other data. The original manufacturing data may include a supply identifier (ID) that is unique to the replaceable supply component. In some examples, the original manufacturing data may include additional information about the replaceable supply component, such as the type and/or model of the replaceable supply component, size of the supply, type of supply, identity of the manufacturer of the replaceable supply component, and other data associated with manufacturing the replaceable supply component, such as the time, date, and/or location of manufacturing.

The memory may include or be non-volatile memory. In some examples, the memory may include a plurality of data partitions for storing data. In some examples, a subset of portions of the memory is non-reprogrammable. In some examples, all portions of the memory are non-reprogrammable. In some examples, a subset of portions of the memory is reprogrammable based on rules, as described further below, such as by non-reversible operations. As described above, the memory may form part of a chip, such as a memory chip, microcontroller, among other types of integrated circuitry. In some examples, the memory is controlled by an external controller and/or is attached to an on-board microcontroller of the replaceable supply component.

As previously described, the memory may be tamper resistant and/or includes security protected memory having embedded security features which allow the OEM to build trust into the replaceable supply component. The tamper resistant memory may provide security protection to the end-user device by preventing or mitigating unauthorized sources from writing data on the memory that is actionable by an end-user device. In some examples, the tamper resistant memory may allow for data to be written to the memory or not written to the memory, while being detectable to the entity requesting the data be written. In some examples, the memory and/or chip may use atomic writing of data, in which an entity may send data to be written in the memory and the data is recorded in full or not recorded at all. In some examples, the memory may include a buffer in which the data is first written and then copied from the buffer into longer term, non-volatile memory. In some examples, the non-volatile memory includes the use of write-once fusible bits with read/write erasable non-volatile memory, where once the fusible bits are set, the chip is disabled from overwriting the memory but reading the data is allowed, such as with Electrically Erasable Programmable Read-Only Memory (EEPROM). In some examples, EEPROM may use a charge-pump to generate greater than 18 Volts to write bits to the EEPROM. Reading of the EEPROM may occur at a lower voltage, such as 3.3 or 1.8 Volts. The memory, organized into data partitions, may have physical fuses which when blown may prevent the charge pump from delivering the charge to the EEPROM cells.

In some examples, the memory may include monotonic counters and/or settable bits that may not be unset. The counters employed in some example chips on ink supplies enforce what is sometimes referred to as RW/Max logical behavior. Any value may be written to the contents of the counters, so long as the value is larger than the currently recorded value. This may not preclude the counters from being used as monotonic counters, while offering more capability.

In some examples, the interface may include a network interface. For example, the interface may include a web browser which connects to a portal. In some examples, the portal may provide access to a reprocess service, as further described herein. The portal may be used to provide the original manufacturing data and/or supply data from the encoding device to the reprocess service. However, examples are not so limited, and the interface may include a communication interface between local devices or between components of a device, such as a local network connection and/or a locally executed reprocess service.

In some examples, requesting authorization to reprocess the replaceable supply component may include generating and sending a data structure that includes the original manufacturing data using the interface. The data structure may be sent to another computing device, such as a local or remote server. In some examples, the data structure may be sent to a reprocess service being executed locally by the encoding device. In some examples, an encoding device may read the original manufacturing data from the replaceable supply component. The encoding device may package the original manufacturing data as a data structure that includes the supply ID of the replaceable supply component. The data structure may be cryptographically signed and/or encrypted, for security purposes, using a key, as further described below. Example security purposes include authentication, attestation, and repudiation, among others.

In some examples, the data structure may include a binary large object (blob). Generating the blob may include adding reprocessing data to the original manufacturing data and/or supply data and cryptographically signing and/or encrypting the blob. Example reprocessing data includes identity of the reprocessor, type and/or capabilities of encoding device (e.g., model, operating system, firmware), encoding device ID, reprocess information (e.g., supply size and/or type to be refilled), among other data. In some examples, the reprocessing data may include an acknowledgement of a successful receipt and encoding of previous appended data, such as a blob previously encoding on the memory. In some examples, a portion of the reprocessing data may be provided as part of a login process to the portal using the interface. For example, a user may enter a user name and password to the interface, which may provide the identity of the reprocessor.

For example, the blob may include a header and a payload, and may be placed in a cryptographic wrapper, such as in a cryptographic envelope that includes the header and the payload, e.g., a request blob including the original manufacturing data. The header may include a description of cryptographic operations and parameters employed by the blob, e.g., how the request blob is encrypted and/or how to decrypt the request blob. The payload may include the original manufacturing data, supply data, and/or reprocessing data. In some examples, blobs described herein may be JavaScript Object Notation (JSON) data structures. However, any number of data formats may be used including CSV, xml, html, and C#, among others. In various examples, the header is a JOSE (JSON Object Signing and Encryption) header, however examples are not so limited.

At 104, in response to the request, the method 100 includes receiving configuration data using the interface. The configuration data includes data to change behavior of the end-user device and/or the replaceable supply component. Example configuration data includes security data, identity of the reprocessor, a feature enable flag of the replaceable supply component, supply model or attributes (e.g., supply size and/or fill), branding, use rules, time stamp, a reprocess count, and various combinations thereof. For example, the time stamp may include a current time, such as Universal Time Coordinated (UTC) time stamp, at the time of reprocessing and which may be used to update a real-time clock of an end-user device in response to attaching the reprocessed replaceable supply component to the end-user device, such as inserting, installing, or otherwise attaching the component to the end-user device. Use rules include rules associated with behavior of the end-user device and/or use of the replaceable supply component. Example use rules include an ejection mode (e.g., print mode), a service mode (e.g., contract, subscription, pay-as-you-go), a supply model or attributes, region conversion, among other rules.

In some examples, the configuration data may be received as another blob that is placed in a cryptographic wrapper, such as a cryptographic envelope that includes a header and the payload, e.g., a return blob including the configuration data, and with the header including a description of cryptographic operations and parameters employed by the blob, e.g., how the return blob is encrypted and/or how to decrypt the return blob. The payload may include the configuration data which is digitally signed.

In some examples, the configuration data includes a supply ID that is provided as part of the original manufacturing data and which ties the configuration data to the particular replaceable supply component. For example, the configuration data may be packaged in a data structure that is cryptographically signed and/or encrypted and that includes the supply ID in a header of the data structure. The encoding device may use the supply ID to verify the configuration data is for the replaceable supply component, such as by matching the supply ID in the header of the data structure to the supply ID read from the memory of the replaceable supply component. In some examples, the configuration data may include a digital signature which may be used by the end-user device to authenticate the configuration data.

At 106, the method 100 includes appending the original manufacturing data stored in the memory with the configuration data to designate the replaceable supply component as reprocessed. The configuration data, as appended in the memory, may cause reconfiguration of an end-user device in response to attachment of the replaceable supply component to the end-user device and execution by the end-user device. In some examples, an encoding device may verify the authenticity of the configuration data, such as using the supply ID, and appends the memory with the configuration data without reading the configuration data.

The configuration data may designate the replaceable supply component as authentically reprocessed by a trusted source and the end-user device may be reconfigured using the configuration data in response to verifying the configuration data is authentic. For example, the end-user device may authenticate the configuration data as being from the trusted source using the digital signature over the configuration data.

In some examples, the digital signature may be generated over the second data and the supply ID using asymmetric signing. As previously described, the data structure includes a header that includes the supply ID and a payload that includes the second data with the digital signature over the payload. With asymmetric signing, two keys are used, one to encrypt and/or digitally sign the payload, and the other to decrypt and/or verify the payload is authentic. The first key may include a private key used to digitally sign data of the data structure and the second key may include a public key used to verify the authenticity of the digital signature and/or the configuration data. In various examples, the second data may be written to the memory and includes the digital signature, which the end-user device may use to verify the authenticity of the second data. For example, the end-user device may include the public key and uses the public key authenticate the digital signature, and in response, to verify the second data is from an authorized source, as further described herein As described above, appending the original manufacturing data may include writing the configuration data on the memory to reconfigure an end-user device in response to attachment of the replaceable supply component, with the configuration data stored in the memory, to the end-user device. In some examples, a portion of the memory is non-reprogrammable and appending the memory includes writing the configuration data in a memory location separate from the original manufacturing data. The end-user device may be reconfigured to change a behavior or functionality of the end-user device.

In some examples, the configuration data may include security data. For example, the security data may be used to provide a security update for the end-user device. In some examples, appending the original manufacturing data with the configuration data may include writing a list of trusted supply IDs and/or a list of suspicious supply IDs. The supply IDs may be unique to supply components, and suspicious supply IDs may be indicative of untrusted or malicious replaceable supply components. As an example, a malicious entity may reuse the same supply ID for a plurality of replaceable supply components, indicating the supply ID is untrusted or malicious. Examples may include other types of security updates, such as updated cryptographic keys used for validating replaceable supply components or other devices in communication with the end-user device. For example, the configuration data may include additional data for authenticating replaceable supply components by the end-user device.

In some examples, the reconfiguration may include a change to use rules for the end-user device. Example use rules include and/or are associated with a region conversion, branding, supply size or fill and/or other supply attributes, ejection mode, and service mode, such as a contract-based service or subscription-based service associated with use of the end-user device, among other behavior changes.

In some examples, portions of the data fields of the original manufacturing data may be rewritten, e.g., re-coded. For example, the memory may be appended with the configuration data during remanufacturing processes for the replaceable supply component. In some examples, appending the configuration data may include writing a first portion of the configuration data in a memory location that is separate from the original manufacturing data and rewriting data fields of the original manufacturing data using a second portion of the configuration data. As previously described, the memory may include a plurality of partitions. For example, the original manufacturing data may be stored in a first partition of the plurality and the first portion of the configuration data may be written in a second partition of the plurality. Example data fields of the original manufacturing data that may be rewritten include a fill level, manufacturer ID, and feature enable flags of the replaceable supply component, among others.

The portions of data fields of the original manufacturing data may be rewritten to reset the data fields and to designate the replaceable supply component as reprocessed, rejuvenated for reuse, and/or for refilling supply. As an example, when refilling supply in a replaceable supply component, data fields may be rewritten such that firmware of the end-user device recognizes the replaceable supply component as filled and recognizes the fill level or supply size of the replaceable supply component. Such data fields may allow data to change in accordance with a set of rules, and the data fields are rewritten using the second portion of the configuration data in a manner that complies with the set of rules. By complying with the set of rules, the end-user device may recognize the rewritten data fields in a secure and accurate manner.

In various examples, the method 100 may be implemented by an encoding device. As used herein, an encoding device includes and/or refers to a device having electrical and/or radio frequency connections to couple to the replaceable supply component, and electronic circuitry to read and write data onto the memory of the replaceable supply component. In some examples, the encoding device may include a printing device or another computing device operated by a reprocessor. In some examples, the encoding device may include an end-user device, such as a printing device operated by an end user. As used herein, an end-user device includes and/or refers to a device that receives the replaceable supply component and dispenses supply using the replaceable supply component. The end-user device may further include electronic circuitry that reads and validates data from the memory of the replaceable supply component, such as authenticating the data as originating from an authorized source. A reprocessor includes and/or refers to an entity performing reprocessing, which may be in control of and/or operates the encoding device.

In the above-described examples, the encoding device may directly or indirectly provide the request to reprocess the replaceable supply component and receive the configuration data from a remotely-located computing device or a local computing device under control of or otherwise in communication with the remotely-located computing device. The remotely-located computing device may form part of a cloud computing system. In some examples, the encoding device communicates directly with the remotely-located computing device or the local computing device. In some examples, the encoding device communicates with a first local computing device that communicates with the remotely-located computing device or with a second local computing device using an interface, such as a web browser.

However, examples are not so limited and the local computing device may not be under control of the remotely-located computing device. In some examples, the encoding device may provide the request to reprocess the replaceable supply component and receive the configuration data from a service that is operated locally by the encoding device.

In some examples, the encoding device includes a printing device, such as a printing device of the reprocessor or of an end user. The printing device (or other type of encoding device) may include specialized firmware to read and write data to and from the memory of the replaceable supply component, such as from a chip of the replaceable supply component. Use of a printing device as the encoding device may reduce the costs for reprocessing and allow for security. The printing device may include an embedded exchange service, such as a webserver, which may be used by the reprocessor to retrieve the original manufacturing data from the replaceable supply component. The printing device may directly or indirectly interface with a cloud service (e.g., reprocess service) to provide configuration data to reprocess the replaceable supply component with. However, examples are not so limited, and other types of encoding devices may be used.

In examples that include use of a cloud service, the cloud computing system may be used to 1) authenticate the reprocessor and/or encoding device and verify the reprocessor and/or encoding device are authorized to reprocess the replaceable supply component and are associated with an account in good standing, 2) authenticate the replaceable supply component is original and/or authentically reprocessed and may be successfully reprocessed, 3) generate the configuration data and signing the configuration data for security, which is provided to the encoding device for writing to the replaceable supply component.

As an example implementation of the method 100, an encoding device may establish a master key with a reprocess service during a registration process. The master key may be established or stored in memory of the encoding device and/or on a database accessible to the reprocess service. When a replaceable supply component is inserted into or otherwise attached to the encoding device, the encoding device may read original manufacturing data, and optionally supply data, from the replaceable supply component and may use the master key and a supply ID from the original manufacturing data to generate a first key, such as a first one-time key or a first key derivative function (KDF)-derived key. The encoding device may generate a data structure that includes the original manufacturing data and use the first key to encrypt the data structure. The encrypted data structure may be used to request authorization to reprocess the replaceable supply component. The data structure may be decrypted by a reprocess service, and/or another computing device (e.g., cloud server or local computing device) that established the master key with the encoding device, by using the master key to obtain the first key and decrypting the data structure using the first pad key. For example, both the reprocess service (or another service in communication with the reprocess service) and the encoding device may independently increment an index associated with the master key to obtain and/or generate one-time keys and/or KDF-derived keys to place blobs in a cryptographic wrapper and to decrypt data in the blobs, such as a cryptographic envelope that includes a header and the payload. The reprocess service may identify the master key using an encoding device ID provided with the request, obtain the first key using the index associated with the identified master key, decrypt the first data using the first key, identify and structure the configuration data based on the type of replaceable supply component, and digitally sign and/or encrypt the configuration data using asymmetric cryptography. For example, the reprocess service may digitally sign and/or encrypt the configuration data and a supply ID using a rotating encryption key, such as a private or secrete key, and provides a key ID with the configuration data. The digital signature may be authenticated and/or decrypted by an end-user device using a public key which the end-user device identifies using the key ID that is part of the configuration data and/or otherwise written to the memory. The reprocess service further uses a second key, such as a second one-time key or a second KDF-derived key, obtained based on the master key and the index to encrypt a second data structure that includes the digitally signed configuration data and the supply ID.

The encoding device may receive the configuration data and identify a supply ID in a header of the second data structure that includes the configuration data, and may obtain the second key using the master key and the index, as incremented by the encoding device, to decrypt data of the second data structure. The encoding device writes the configuration data, which includes the digital signature over the configuration data and the key ID, on the memory of the replaceable supply component to designate the replaceable supply component as reprocessed by an authorized source. For example, the second data structure may indicate what data to write on the replaceable supply component, as well as where on the memory to write the data. The encoding device writes the configuration data, with the digital signature over the configuration data and the key ID, to the memory. In response to attachment of the replaceable supply component to an end-user device, the end-user device may validate the configuration data as being authentic and/or from an authorized source by using the key ID to identify a public key to validate the digital signature over the configuration data and/or decrypt the configuration data.

However, examples are not so limited and other types of cryptographic authentication may be used, such as public keys and private keys, and/or master keys which are specific to the supply ID, among other techniques.

FIG. 2 illustrates an example device including non-transitory computer-readable storage medium, in accordance with examples of the present disclosure. In various examples, the device 210 may be a remotely-located computing device, a local computing device, or the encoding device used to append data on the memory of the replaceable supply component.

The device 210 includes a processor 212 and memory. The memory may include a computer-readable storage medium 214 storing a set of instructions 216, 218, and 220. The computer-readable storage medium 214 may include Read-Only Memory (ROM), Random-Access Memory (RAM), Electrically Erasable Programmable Read-Only Memory (EEPROM), flash memory, a solid state drive, Electrically Programmable Read Only Memory aka write once memory (EPROM), physical fuses and e-fuses, and/or discrete data register sets. In some examples, computer-readable storage medium 214 may be a non-transitory storage medium, where the term "non-transitory" does not encompass transitory propagating signals.

In some examples, the processor 212 and computer-readable storage medium 214 may form part of a remotely-located computing device, such as a cloud server forming part of a cloud computing system. In some examples, the processor 212 and computer-readable storage medium 214 may form part of a computing device that is local to the encoding device, sometimes herein referred to as "a local computing device". In some examples, the processor 212 and computer-readable storage medium 214 may form part of the encoding device, such as when the encoding device executes a reprocess service.

At 216, the processor 212 may authenticate a replaceable supply component using original manufacturing data stored in memory of the replaceable supply component. The original manufacturing data may be provided as part of a request to reprocess the replaceable supply component, which may be received from an encoding device. The request may include a request blob provided by the encoding device. The authentication may include authenticating the identity of the replaceable supply component using a supply ID in the request. In some examples, as further described below, the processor 212 may authenticate the identity of the encoding device and/or verify the encoding device and/or replaceable supply component are authorized for reprocessing, e.g., capable of performing and associated with an account in good standing and/or with the reprocess service enabled.

At 218, in response to the authentication, the processor 212 may generate configuration data for appending the original manufacturing data. The configuration data may be readable by an end-user device in response to attachment of the replaceable supply component to the end-user device. The configuration data may cause reconfiguration of the end-user device. In some examples, the configuration data may be identified and generated based on an account associated with the replaceable supply component. For example, the supply ID may be used to identify the supply type and/or an account and to generate the configuration data. The processor 212 may generate the configuration data as a data structure. For example, the configuration data may be structured as a blob, sometimes herein referred to as a "response blob", based on the type of encoding device and the type of replaceable supply component. In some examples, the processor 212 may cryptographically sign and/or encrypt the response blob, such as digitally signing the configuration data of the blob and placing the blob in a cryptographic wrapper, as previously described.

At 220, the processor 212 may provide the configuration data to append the original manufacturing data stored in the memory and to designate the replaceable supply component as reprocessed. In some examples, the replaceable supply component may be designated as authentically reprocessed by a trusted source. For example, the configuration data may be authenticated as being from a trusted source. In some examples, the configuration data includes a digital signature which may be used by an end-user device to authenticate the configuration data as being from a trusted source. In some examples, the device 210 provides the configuration data to an encoding device which appends the configuration data on the memory. In some examples, the device 210 provides the configuration data to another computing device, such as a local computing device, which provides the configuration data to the encoding device. In some examples, the device 210 is the encoding device, and a reprocess service executed by the device 210 provides the configuration data for appending the memory.

In various examples, the processor 212 receives a request to authorize reprocessing of the replaceable supply component. The request may include the original manufacturing data, the supply ID, and an encoding device ID, among other data, such as supply data and/or reprocessing data. In response to the request, the processor 212 may authenticate and/or authorize the replaceable supply component for reprocessing using the supply ID. The processor 212 may further authenticate and/or authorize the encoding device for performing the reprocessing using the encoding device ID. In some examples, the request is for authorization to reuse or refill the replaceable supply component. In such examples, the processor 212 may authenticate and authorize the replaceable supply component for reprocess and reuse using the supply ID, and may authenticate and authorize the encoding device for performing the reprocessing using the encoding device ID. The authentication and/or authorization of the replaceable supply component may include validating existing supply data along with the supply ID and/or comparing a reprocess count to a threshold, as further described herein. In some examples, in response to the authentication and/or authorization, the replaceable supply component may be designated as reprocessed for reuse and/or as refilled.

In some examples, the processor 212 may authenticate the replaceable supply component and generate the configuration data by executing instruction to extract the supply ID and supply data from the request, and to identify an account associated with the replaceable supply component using the supply ID. For example, a customer and/or other end user and reprocessor may be associated with different supply IDs and encoding device IDs in a database. The database may include data associated with providing the reprocess service, including supply IDs, encoding device IDs, account information, authorization for reprocessing, keys for encrypting and decrypting data, activation or challenge codes, and digital signatures, among other data. The account information may include accounts of reprocessors and end users. For example, the account information may associate an account with specific supply IDs or encoding device IDs, identify activated features of the reprocess service, and include information about the encoding devices, such as capabilities, and/or information about the supply components, such as past supply data and supply component capabilities. In some examples, the processor 212 verifies that the replaceable supply component is authorized for the reprocessing by comparing the supply ID to a list of trusted supply IDs and/or suspicious supply IDs, identifying the supply ID is associated with the account that enabled a reprocess service and is in good standing, determining the replaceable supply component is compatible with rules (e.g., region or stock-keeping unit (sku)) and/or has the correct security and available challenges. In some examples, the processor 212 extracts an encoding device ID from the request, and uses the encoding device ID to verify authorization of the encoding device for reprocessing the replaceable supply component. The encoding device ID may be unique to the encoding device.

In some examples, the processor 212 may generate configuration data by identifying a security update. The security update may be specific to the account associated with the replaceable supply component. Example security updates include decryption keys, activation keys, a list of trusted supply IDs, a list of suspicious supply IDs, configuration date (e.g., region and sku compatibility), and combinations thereof. In some examples, the processor 212 may generate the configuration data by identifying changes in behavior of the end-user device based on the account, such as an ejection mode of the end-user device, a service mode of the end-user device, a supply model and/or attributes, and various other changes and/or use rules.

The processor 212 may generate the configuration data as a cryptographically signed data structure, e.g., blob, based on the account and/or an encoding device ID. The cryptographically signed data structure may include the supply ID in a header of the data structure. For example, the processor 212 may select a template to use to structure the response blob based on the type of encoding device and the type of supply component attached thereto, and to include specific data based on the account and/or the supply type. In some examples, different OEMs and/or different types of memory may use different data templates for storing data, which may be identified using the supply ID and used to structure the configuration data such that an end-user device may recognize the configuration data with or without a network connection. The account may indicate changes in supply service or use of the end-user device, among other changes, as previously described.

In some examples, the authorization may fail. The processor 212, in response to the authorization failing, may provide error data to deny the authorization of reprocessing the replaceable supply component. In some examples, the error data may include an indication of the supply ID of the replaceable supply component being malicious or untrusted, such that subsequent attachment of the replaceable supply component to an end-user device may cause the end-user device to reject the replaceable supply component. In some examples, the error data may include an indication of an error including a description of the error encountered.

In some examples, the authorization may fail due to a threshold reprocess count being reached for the replaceable supply component. The reprocess count may include the number of times the memory has been reprocessed or otherwise had data appended. For example, the replaceable supply component may be reprocessed a threshold number of times and after the threshold is reach, may not be reprocessed again. In some examples, the threshold is set based on the number of partitions of the memory. In some examples, the memory may store the reprocess count as a data field which is updated by the configuration data. In some examples, the reprocess count is stored in the computer-readable storage medium 214 of the device 210 and/or in a database of a cloud computing system.

As described above, in some examples, the device 210 may form part of a cloud computing system having a plurality of remotely-located and/or distributed computing devices. For example, although FIG. 2 illustrates a single processor 212 and a single computer-readable storage medium 214, examples are not so limited and may be directed to devices and/or systems with multiple processors and multiple computer-readable storage mediums. The instructions may be distributed and stored across the multiple computer-readable storage mediums and may be distributed and executed by the multiple processors.

FIG. 3 illustrates an example end-user device, in accordance with examples of the present disclosure. The end-user device 315 may be in communication with the device 210 or may be an implementation of the device 210 of FIG. 2, in some examples.

The end-user device 315 includes a housing 317 and electronic circuitry 319. The housing 317 is to receive a replaceable supply component 321 including memory 323, such as the replaceable supply component and memory previously described by FIG. 1. The electronic circuitry 319 is contained within the housing 317 and includes or is coupled to electrical connections to communicate with the memory 323. In some examples, the electronic circuitry 319 may include a processor and memory, such as previously described in connection with FIG. 2. In some examples, the end-user device 315 may execute a firmware update or modification to facilitate use of reprocessed replaceable supply components. For example, without the update, the end-user device 315 may not recognize the configuration data 313 of the replaceable supply component 321 and/or may identify the replaceable supply component 321 as used.

In some examples, the electronic circuitry 319 authenticates the replaceable supply component 321 using original manufacturing data 311 stored in the memory 323 and authenticates configuration data 313 stored in the memory 323, with the configuration data 313 being appended to the original manufacturing data 311. The configuration data 313 may include, for example, a payload used to authenticate the configuration data as being from a trusted source. The payload may include a digital signature over the configuration data 313 with a key ID, in some examples.

In some examples, to authenticate the replaceable supply component 321, the end-user device 315 may request a supply ID from the replaceable supply component 321 and may use the supply ID to derive a symmetric key. Using the derived key, a challenge in the form of a random number may be sent to the replaceable supply component 321 and encrypted using the symmetric key within the replaceable supply component 321. The encrypted value is passed back to the end-user device 315 and decrypted using the derived key. If there is a match, the replaceable supply component 321 is authenticated by the end-user device 315.

In some examples, the configuration data 313 is authenticated using the digital signature. As previously described, the digital signature may be generated using a rotating key, such as a private key, which the end-user device 315 decrypts and/or validates using a public key identified using the key ID written to the memory 323. The end-user device 315 may include a plurality of public keys which may be identified using associated key IDs, and in some examples, the public keys may be updated using the configuration data 313.

The electronic circuitry 319, in response to the authentication of the replaceable supply component 321 and configuration data 313, revises the configuration of the end-user device 315 using the configuration data 313. The electronic circuitry 319 may revise the configuration of the end-user device 315 independent of, e.g., with or without, a network connection or other communication with remotely-located devices using the configuration data 313 locally read from the memory 323 of the replaceable supply component 321.

In some examples, the revised configuration of the end-user device 315 may include a security update that is provided to the end-user device 315 using the configuration data 313. For example, the electronic circuitry 319 may provide the security update to the end-user device 315 using the configuration data 313 and in response to authenticating the configuration data 313 using a digital signature. In some examples, the revised configuration includes other types of behavior changes, such as changes in ejection mode, service mode, supply model or attributes (e.g., supply size and fill level), changes in region, among other changes. In some examples, the reconfiguration may cause changes in user experience when using the end-user device 315.

In some examples, the electronic circuitry 319 may be unable to authenticate the replaceable supply component 321 and/or the configuration data 313. In response, the electronic circuitry 319 may reject the replaceable supply component 321, such as not using supply from the replaceable supply component 321 and/or providing an error message to a user. In some examples, the electronic circuitry 319 may authenticate the replaceable supply component 321 and may be unable to authenticate the configuration data 313. In some such examples, the electronic circuitry 319 may not use the configuration data 313 to revise a configuration of the end-user device 315, and may use the replaceable supply component 321 to dispense supply but with limited functionalities.

In some examples, the end-user device 315 includes the replaceable supply component 321. The memory 323 may store the configuration data 313 in a memory location separate from the original manufacturing data 311, as previously described.

In some examples and as described above, the end-user device 315 may be used as an encoding device. For example, the electronic circuitry 319 may read the original manufacturing data 311 from the memory 323 and request authorization to reprocess the replaceable supply component 321 using an interface and the original manufacturing data 311, receive the configuration data 313 using the interface in response to the authorization, and append the original manufacturing data 311 with the configuration data 313 and the digital signature to designate the replaceable supply component 321 as reprocessed. In some examples, the replaceable supply component 321 may be refilled or otherwise reprocessed, and upon install into the end-user device 315, the configuration data 313 is written to the memory 323 by the end-user device 315.

Figure 4:
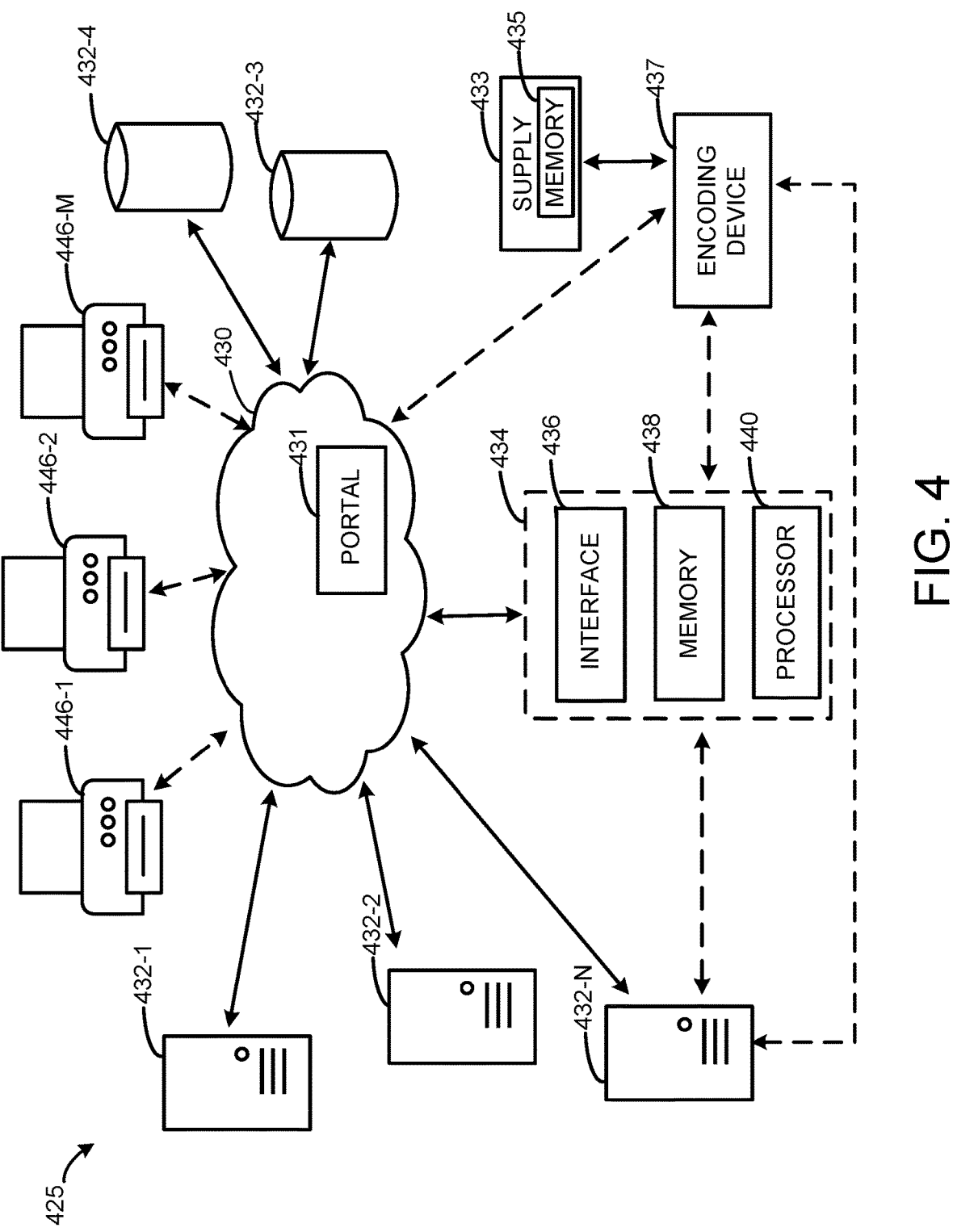
FIG. 4 illustrates an example system for reprocessing a replaceable supply component to reconfigure an end-user device, in accordance with examples of the present disclosure.

FIG. 4 illustrates an example system for reprocessing a replaceable supply component to reconfigure an end-user device, in accordance with examples of the present disclosure. In some examples, the system 425 may include or form part of a cloud computing system. However, examples are not so limited.

The example system 425 includes a plurality of distributed computing devices 432-1, 432-2, 432-3, 432-4 . . . 432-N, herein generally referred to as the "plurality of distributed computing devices 432" for ease of reference, that provide a reprocess service. A reprocess service may include interoperable routines that when executed are used to authenticatively and securely reprocess a replaceable supply component. In some examples, the plurality of distributed computing devices 432 may include servers 432-1, 432-2, 432-N and/or databases 432-3, 432-4 that form part of a cloud computing system 430.

The example system 425 further includes a portal 431 to communicatively connect the plurality of distributed computing devices 432 to a plurality of external devices. The plurality of external devices may include an encoding device 437, a computing device 434, and/or a plurality of end-user devices 446-1, 446-2 . . . 446-M. In some instances, a subset of the plurality of external devices may not be connected to the cloud computing system 430, such as the encoding device 437 and/or particular end user-devices 446-1, 446-2 . . . 446-M. The subset of the plurality of external devices may not be in communication with the plurality of distributed computing devices 432. FIG. 4 illustrates optional communication connections with dashed arrows. Although FIG. 4 illustrates the end user-devices 446-1, 446-2 . . . 446-M as printing devices, examples are not so limited and the end-user devices may include other types of supply ejecting devices as previously described. In some examples, as further shown by FIG. 5, the system 425 may include a firewall between the plurality of distributed computing devices 432 and the plurality of external devices, such as devices under control of the reprocessor.

In some examples, the plurality of distributed computing devices 432 may provide the reprocess service. For example, the plurality of distributed computing devices 432 may receive, from the encoding device 437, a request to reprocess a replaceable supply component 433. As previously described, the request may include original manufacturing data stored in memory 435 of the replaceable supply component 433.

In some examples, the encoding device 437 may provide the request directly to the portal 431. For example, the encoding device 437 may include the interface 436 used to connect to the portal 431. In some examples, the encoding device 437 provides the original manufacturing data and/or the request to a separate computing device 434 that includes the interface 436 to connect to the portal 431. For example, the computing device 434 may include a memory 438 and a processor 440 to execute instructions stored in the memory 438 to provide the interface 436 to communicate with the portal 431. The interface 436 may include a web browser and the encoding device 437 may copy the request and provide the request to the interface 436, such as by copy and paste operations.

The plurality of distributed computing devices 432 may authorize the request. For example, the plurality of distributed computing devices 432 may verify authorization of the encoding device 437 for the reprocess service using an encoding device ID, and verify authorization of the replaceable supply component 433 for the reprocess service using a supply ID. In some examples, the authorization of the request may include authenticating the identities of the replaceable supply component 433 and the encoding device 437, and verifying the replaceable supply component 433 and the encoding device 437 are authorized for the reprocess service.

In response to verifying authorization of the encoding device 437 and the replaceable supply component 433, the plurality of distributed computing devices 432 may provide configuration data to the encoding device 437 to append data content of the memory 435 with and to designate the replaceable supply component 433 as reprocessed. The configuration data may be generated as a blob that is formatted based on a type of replaceable supply component 433. The blob may include the supply ID that is unique to the replaceable supply component 433 and which is provided as part of the request. The configuration data may be identified based on an account associated with the supply ID of the replaceable supply component 433 and the type of supply. For example, the configuration data may include different attributes for different types of supply, such as fill level for a toner cartridge or base key table, a datastore, a challenge length, and partition data for an ink cartridge. In some examples, the blob may be structured to prevent other devices from interpreting the data, such as using encryption and a digital signature. For example, the plurality of distributed computing devices 432 may encrypt and/or digitally sign the blob in a manner that is specific to the replaceable supply component 433.

However, examples are not so limited. In some examples, the encoding device 437 communicates the request to a particular computing device 432-N of plurality of distributed computing devices 432 which forms part of a local network with the encoding device 437 and/or the computing device 434. For example, the encoding device may directly communicate with the particular computing device 432-N or communicate with the computing device 434 that communicates with the particular computing device 432-N. In some examples, the particular computing device 432-N may form part of a local network with the encoding device 437, is in communication with and/or under control of the cloud computing system 430, and obtains the relevant data to provide the reprocess service. In other examples, the encoding device 437 may itself include the relevant data to provide the reprocess service, which may be obtained from the cloud computing system 430.

Figure 5:
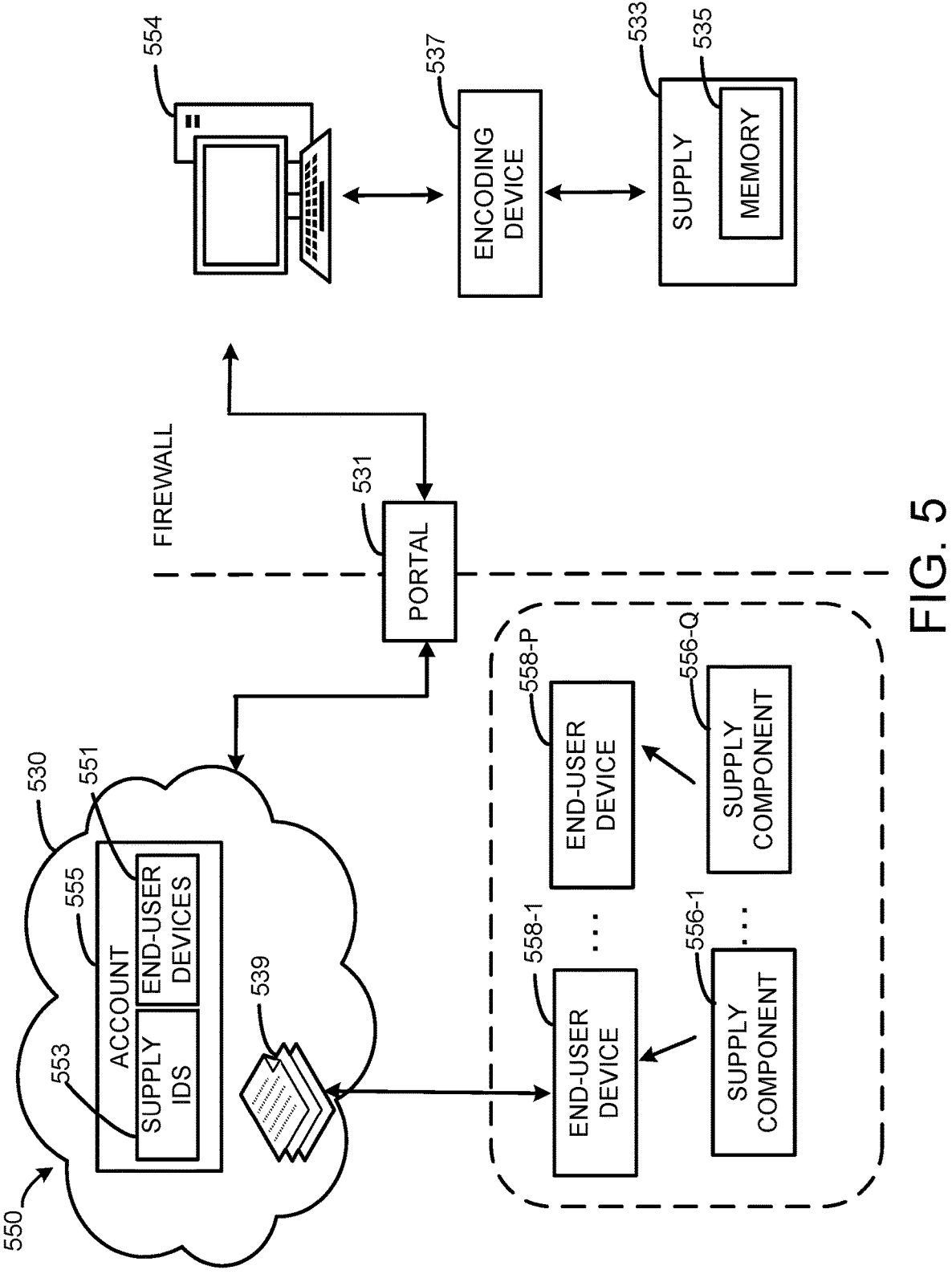
FIG. 5 illustrates an example system for appending data on a replaceable supply component, in accordance with examples of the present disclosure.

FIG. 5 illustrates an example system for appending data on a replaceable supply component, in accordance with examples of the present disclosure. The system 550 may be used to implement the method 100 of FIG. 1 and/or may include an implementation of the system 425 of FIG. 4 in various examples. In some examples, the device 210 of FIG. 1 and/or the end-user device 315 of FIG. 3 may form part of the system 550 of FIG. 5.

As shown and similar to FIG. 4, the system 550 includes a network, such as a cloud computing system 530 which includes a portal 531 to provide connections between distributed computing devices, e.g., cloud servers and databases, and an encoding device 537. The encoding device 537 may be registered with a reprocess service of the cloud computing system 530.

In the specific example, a replaceable supply component 533 having memory 535 is attached to the encoding device 537. The encoding device 537 reads data from the memory 535 including original manufacturing data. In some examples, the encoding device 537 reads all of the data on the memory 535 and/or a chip, such as the supply ID, the region, and supply attributes. In a specific example, for a printing supply component, the encoding device 537 may read the supply ID, region, pages printed, and number of times used.

The encoding device 537 formats a request to reprocess the replaceable supply component 533 using a master key. In some examples, all the data read from the memory 535 is provided as part of the request. In some examples, a subset of the data read is provided as part of the request. For example, the encoding device 537 may copy and paste the original manufacturing data into a web browser using an embedded exchange service, e.g., webserver. The web browser may form part of the encoding device 537 or may be on a separate computing device 554 which interfaces with the encoding device 537. The web browser may interact with the portal 531 of the cloud computing system 530. For example, the web browser may provide the request to the portal 531, thereby sending the request to the cloud computing system 530. In some examples, the request may include a supply size or fill, region, brand or identity of the manufacturer or reprocessor, among other data. Prior to sending the request, a user may login to the portal 531 using a user name and password, and which ties the request to an account of the reprocessor.

In some examples, the request is provided by the encoding device 537 to the cloud computing system 530. A reprocess service of the cloud computing system 530 may process the request by determining whether the encoding device 537 is authorized to reprocess the replaceable supply component 533. For example, the identity of the encoding device 537 may be authenticated and the encoding device 537 is verified as being authorized for the reprocessing. In response to determining the encoding device 537 is not authorized, the request is denied. In response to determining the encoding device 537 is authorized, the original manufacturing data and other data is evaluated. For example, a supply ID and supply data are extracted from the data sent as part of the request. Using the supply ID, the identity of the replaceable supply component 533 may be authenticated and the replaceable supply component 533 is verified as being authorized for the reprocessing. In some examples, authenticating and/or authorizing the replaceable supply component 533 may include determining the replaceable supply component 533 is compatible with rules (e.g., correct region or sku) and/or verifying the memory 535 has the correct security and available challenges.

As a specific example, the cloud computing system 530 may authenticate and authorize the encoding device 537 by determining whether the reprocessor and/or the encoding device 537 are trusted sources and/or are authorized to reprocess the replaceable supply component 533 based on an account associated with the login information and/or an encoding device ID. As previously described, the cloud computing system 530 may include a database that includes accounts associated with reprocessors and end users, supply IDs of a plurality of replaceable supply components, encoding device IDs of a plurality of registered encoding devices, encryption and decryption keys, and information about the replaceable supply components. The reprocessor may have an account that associates the reprocessor with different encoding devices and indicates authorization or not for reprocessing different replaceable supply components. The cloud computing system 530, via a computing device, may query the database to verify the supply ID and/or encoding device ID.

In response to determining the replaceable supply component 533 and/or encoding device 537 is not authorized, the request is denied. In response to determining the replaceable supply component 533 is authorized, the cloud computing system 530 determines the configuration data based on an account associated with the replaceable supply component 533. For example, a particular account 555 may associate supply IDs 553 (that identify particular replacement supply components) with identified end-user devices 551, which may include a subset of the end-user devices 558-1 . . . 558-P and reprocessed supply components 556-1 . . . 556-Q of the system 550. The information for the account 555 may be used to identify configuration data, such as an update to the list 539, as further described herein. In some examples, the cloud computing system 530 may generate the configuration data by determining data fields to be written, such as region, brand, fill level, gas gauge offset, security updates, a reprocessor identifier, a feature enable flag of the replaceable supply component, supply attributes, use rules, time stamp, a reprocess count, and a protective digital signature. The cloud computing system 530 may send the configuration data to the web browser to provide to the encoding device 537, and may indicate a charge for the reprocess service.

The encoding device 537 may write the configuration to the memory 535. In some examples, the configuration data is copied from the browser using the computing device 554 and providing to the encoding device 537 using the exchange service, e.g., a webserver.

In some examples, the configuration data is used to reconfigure an end-user device that the replaceable supply component 533 is to be inserted into or otherwise attached to. For example, the cloud computing system 530 may include a list 539 of trusted and/or suspicious supply IDs. The list 539 may be maintained and updated overtime. The list 539, as updated, may be provided to end-user devices 558-1 . . . 558-P using reprocessed supply components 556-1 . . . 556-Q to provide security updates. The end-user devices 558-1 . . . 558-P may be reconfigured with the security update, with or without a network connection to the cloud computing system 530. For example, the list 539 may be updated based on known malicious supply IDs, the same supply ID being used simultaneously in different locations, the same supply ID being used a threshold number of times and/or within a threshold time, supply IDs of seized supply components, tags that failed validations for being counterfeit, replaceable supply components being removed from established channels and/or identified as infringing on intellectual property rights, such as patent, trademark, and/or copyrights.

However examples are not so limited and may include other types of systems, such as local network system, and other types of reconfigurations, such as key updates and test updates for authenticating supply components, and other changes in end-user device behavior.

As a specific example, the encoding device 537 registers with the reprocess service of the cloud computing system 530 and stores a master key. When the replaceable supply component 533 is attached to the encoding device, the encoding device 537 reads original manufacturing data and other data from the memory 535 and generates a first one time-key using the master key and an index that is incremented by the encoding device. The encoding device 537 packages the original manufacturing data (and other data) into a request blob and that is encrypted using the first key and/or is digitally signed, such as placing the request blob in a cryptographic wrapper. The original manufacturing data in the request blob includes the supply ID that is unique to the replaceable supply component 533.

The reprocess service receives the request blob and decrypts data in the request blob by obtaining the first key. For example, the reprocess service identifies the master key using the encoding device ID in the header of the request blob, obtains the first key using an index that is incremented by the reprocess service or another service and the master key, and decrypts data in request blob using the first key. The reprocess service may verify the replaceable supply component 533 is authorized for reprocessing using the supply ID in the request blob. In some examples, the supply ID may be tied to an account in a database that identifies the reprocess service is enabled and/or a reprocess count of the replaceable supply component 533. In some examples, the supply ID may identity the supply type and the reprocess service may verify the supply type may be reprocessed based on compatibility with rules, security settings, and/or available challenges, among other features. The reprocess service may further verify that the encoding device 537 is authorized using the encoding device ID. The encoding device 537 may be registered with the reprocess service and the encoding device ID is stored in the database. For example, the encoding device ID may be used to verify that the encoding device 537 is associated with a trusted source. In some examples, the reprocess service may verify the reprocessor operating the encoding device 537 is authorized, such as identifying the reprocessor operating the encoding device 537 has enabled the reprocess service and/or is in good standing. The verification may be based on an account associated with the encoding device ID and/or the login information provided to the portal 531. In response to the authorization, the reprocess service generates the configuration data, which includes data specific to and/or depending on the type of replaceable supply component 533 and is digitally signed. The reprocess service packages the configuration data into a response blob that is encrypted using a second key generated using the master key and the index incremented by the reprocess service or another service, such as placing the response blob in a cryptographic wrapper. The response blob including the configuration data may include the supply ID in the header, such that the encoding device 537 may verify the response blob is authentic to the replaceable supply component 533 and writes the configuration data on the memory 535.

The configuration data may be written with the digital signature over it and includes a key ID for the end-user device to use to verify authenticity of the configuration data. For example, the end-user device may not reconfigure itself using the configuration data unless the configuration data is authenticated by decrypting and/or validating the digital signature using the key identified by the key ID. Authenticating the configuration data may indicate that the configuration data is from a trusted and/or authorized source.

FIGS. 6A-6D illustrate example systems for appending data on a replaceable supply component, in accordance with examples of the present disclosure. Some examples of the present disclosure may include various variations, such as the encoding device including an end-user device and/or the encoding device designating the reprocessing of the replaceable supply component using a locally stored and executed reprocess service.

Figure 6A:
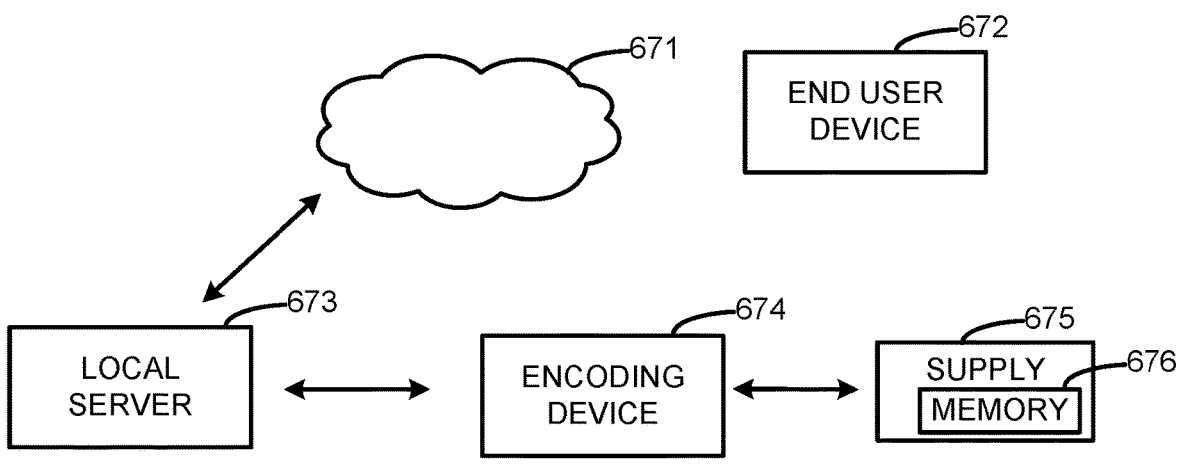
FIGS. 6A-6D illustrate example systems for reprocessing a replaceable supply component, in accordance with examples of the present disclosure.

FIG. 6A illustrates an example system that includes an encoding device 674 that receives the replaceable supply component 675 having memory 676 and communicates a request to reprocess the replaceable supply component 675 to a local server 673 using a local network communication. The local server 673 may be in communication with and/or controlled by a cloud computing system 671. For example, the local server 673 may store data for generating the configuration data and for encrypting and digitally signing the configuration data, such as keys, supply IDs, encoding device IDs, digital signatures, and account information, among other data. In some examples, the replaceable supply component 675 is appended with the configuration data that may be verified as authentic by the end-user device 672 and used to and used to reconfigure the end-user device 672 that may or may not have a network connection, such as verifying the configuration data is from a trusted source using the digital signature over the configuration data.

Figure 6B:
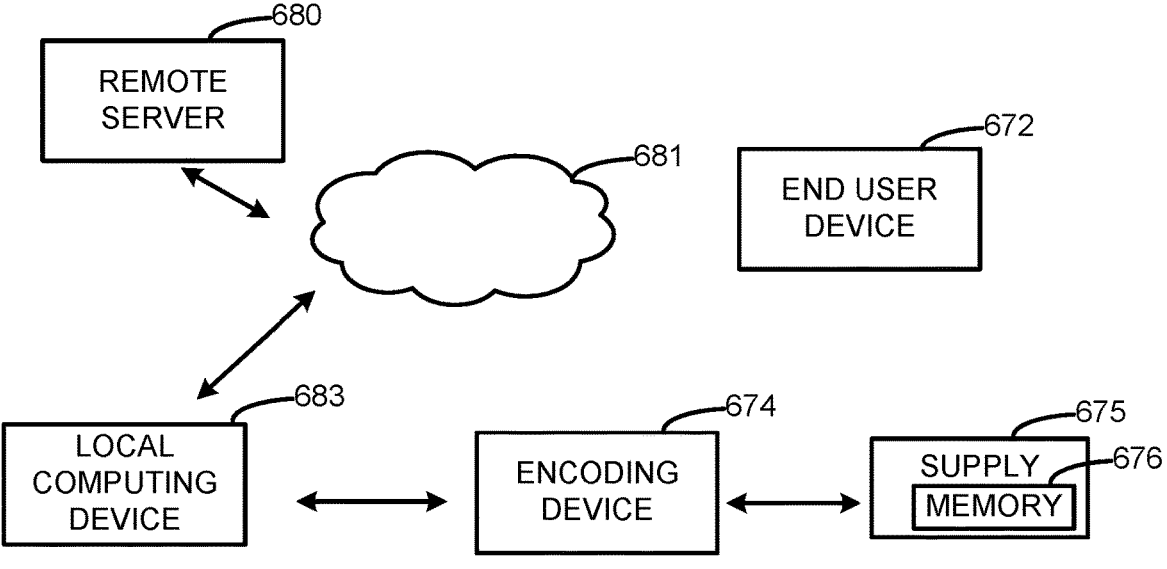

FIG. 6B illustrates an example system that includes an encoding device 674 that receives the replaceable supply component 675 having memory 676 and communicates a request to reprocess the replaceable supply component 675 to a local computing device 683. The local computing device 683 may communicate with the cloud computing system 681 using a portal, as illustrated by FIG. 5. A remote server 680 of the cloud computing system 681 processes the request and provides the configuration data to the local computing device 683 which communicates the configuration data to the encoding device 674. The replaceable supply component 675 is appended with the configuration data that may be verified as authentic by, and used to reconfigure, the end-user device 672.

Figure 6C:
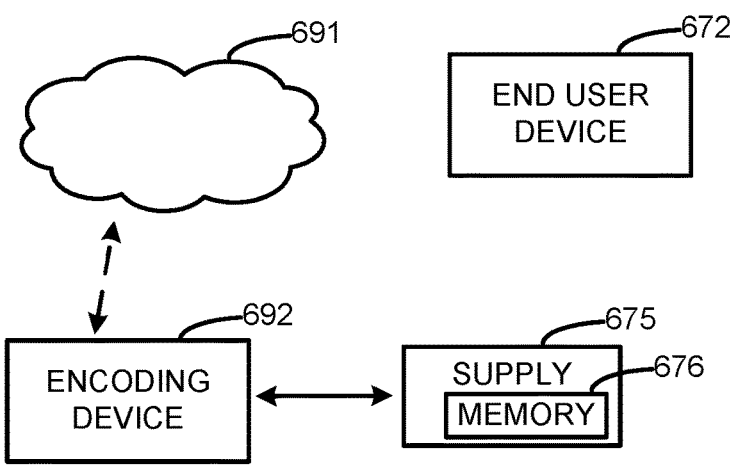

FIG. 6C illustrates an example system that includes an encoding device 692 that receives the replaceable supply component 675 having memory 676 and processes a request to reprocess the replaceable supply component 675. In some examples, the encoding device 692 may include and execute the reprocess service, which may be obtained from the cloud computing system 691 using a portal. The encoding device 692 locally processes the request and provides the configuration data for appending the memory 676 with, which may be verified as authentic by, and used to reconfigure, the end-user device 672.

Figure 6D:
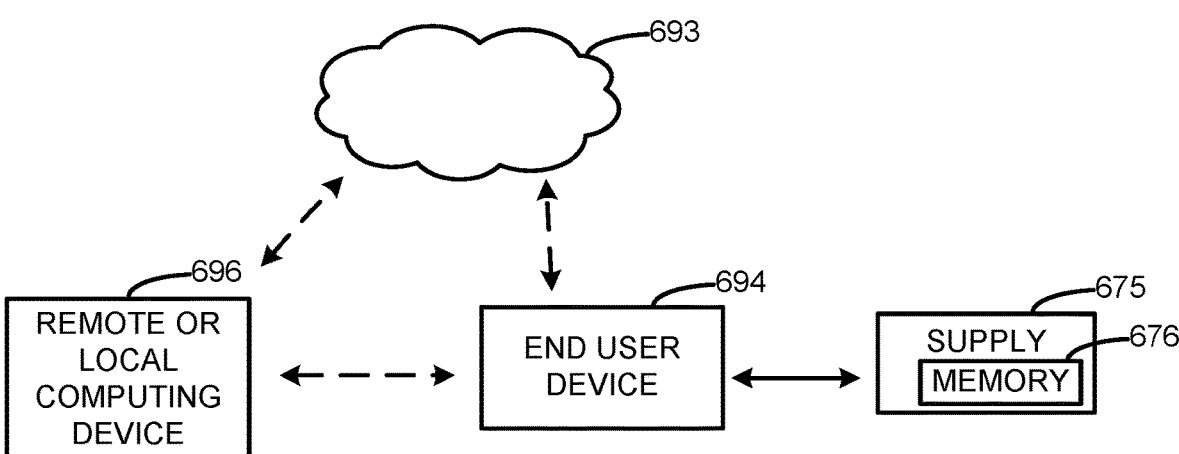

FIG. 6D illustrates an example system that includes an encoding device is an end-user device 694. The end-user device 694 receives the replaceable supply component 675 having memory 676 and communicates a request to reprocess the replaceable supply component 675 to a local computing device or remote computing device 696 using a local network or the portal of the cloud computing system 693, respectively. The local computing device or remote computing device 696 may process the request and provide the configuration data to the end-user device 694. The replaceable supply component 675 is appended with the configuration data that may be verified as authentic by, and used to reconfigure, the end-user device 694.

Examples in accordance with the present disclosure are directed to reprocessing replaceable supply components in a secure manner such that the replaceable supply components may be used multiple times while still providing full functionality. The reprocessing may allow for additional end user choices and reconfiguration of end-user devices, such as providing dynamic security updates that that improve security of the end-user devices without use of a firmware update. The end-user devices may be securely updated without being network connected by appending data to the memory of the replaceable supply components that may be validated as originating from a trusted source.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method comprising:

generating and transmitting, by a computing device of a reprocessing service, a request for authorization to reprocess a replaceable supply component that has already been used by an end-user device, by:

generating a binary large object (blob) that includes original manufacturing data of the replaceable supply component stored in memory of the replaceable supply component;

adding reprocessing data to the original manufacturing data of the blob;

cryptographically signing the blob; and sending the cryptographically signed blob as the request, wherein the reprocessing service reprocesses the replaceable supply component by either or both of remanufacturing the replaceable supply component and refilling the replaceable supply component;

receiving, by the computing device of the reprocessing service, configuration data for designating the replaceable supply component as having been reprocessed and for reconfiguring end-user devices of a type that use the replaceable supply component, including the end-user device that has already used the replaceable supply component; and appending, by the computing device of the reprocessing service, the original manufacturing data of the replaceable supply component stored in the memory of the replaceable supply component with the configuration data, wherein upon attachment of the replaceable supply component to a given end-user device that is either the end-user device that has already used the replaceable supply component or a different end-user device of the type that uses the replaceable supply component, the given end-user device reconfigures itself in accordance with the configuration data stored in the memory of the replaceable supply component.

2. The method of claim 1, further including appending the memory with the configuration data during a remanufacturing process for the replaceable supply component, wherein a portion of the memory is non-reprogrammable and appending the memory includes writing the configuration data in a memory location separate from the original manufacturing data.

3. The method of claim 1, wherein appending the original manufacturing data includes writing the configuration data on the memory to designate the replaceable supply component as authentically reprocessed by a trusted source, the configuration data including security data for the end-user device.

4. The method of claim 1, wherein appending the original manufacturing data includes writing the configuration data on the memory, the configuration data including data selected from:

a list of trusted supply identifiers, a list of suspicious supply identifiers, and a combination thereof.

5. The method of claim 1, wherein appending the original manufacturing data includes writing the configuration data on the memory, the configuration data including data selected from an ejection mode, a service mode, a supply model, supply attributes, and a combination thereof.

6. The method of claim 1, wherein the blob comprises a header and a payload, the cryptographically signed blob comprises a cryptographic envelope including the header and the payload, the payload comprises the original manufacturing data and the reprocessing data, and the header comprises a description of cryptographic operations and parameters used to cryptographically sign the original manufacturing data and the reprocessing data.

7. The method of claim 6, wherein generating and transmitting the request comprises, before cryptographically signing the blob, adding supply data to the original manufacturing data of the blob in addition to the reprocessing data that has been added.

8. A non-transitory computer-readable storage medium comprising instructions that when executed cause a processor to:

receive a request from a computing device of a reprocessing service for authorization to reprocess a replaceable supply component that has already been used by an end-user device, the request including original manufacturing data of the replaceable supply component stored in memory of the replaceable supply component, wherein the reprocessing service reprocesses the replaceable supply component by either or both of remanufacturing the replaceable supply component and refilling the replaceable supply component;

authenticate the replaceable supply component using the original manufacturing data;

in response to successful authentication, generate and transmit a response to the computing device of the reprocessing service, by:

generating a binary large object (blob) that includes configuration data for designating the replaceable supply component as having been reprocessed and for reconfiguring end-user devices of a type that use the replaceable supply component, including the end-user device that has already used the replaceable supply component;

cryptographically signing the blob; and sending the cryptographically signed blob as the response, wherein upon receipt of the configuration data, the reprocessing service appends the configuration data to the original manufacturing data in the memory of the replaceable supply component, and upon attachment of the replaceable supply component to a given end-user device that is either the end-user device that has already used the replaceable supply component or a different end-user device of the type that uses the replaceable supply component, the given end-user device reconfigures itself in accordance with the configuration data from the replaceable supply component.

9. The non-transitory computer-readable storage medium of claim 8, wherein the request further includes a supply identifier of the replaceable supply component, and a service identifier of the reprocessing service, and the instructions, when executed, cause the processor to further:

authorize the replaceable supply component for reprocessing, using the supply identifier; and authorize the reprocessing service to perform reprocessing, using the service identifier.

10. The non-transitory computer-readable storage medium of claim 8, wherein the instructions to generate the configuration data, when executed, further cause the processor to:

identify an account associated with the replaceable supply component using a supply identifier;

identify a security update, the security update including data selected from:

decryption keys, activation keys, a list of trusted supply identifiers, a list of suspicious supply identifiers, configuration date, and combinations thereof; and generate the configuration data as a cryptographically signed data structure based on the account and an encoding device identifier, the configuration data including the security update and the cryptographically signed data structure including the supply identifier that is unique to the replaceable supply component.

11. The non-transitory computer-readable storage medium of claim 8, wherein the request further includes a supply identifier of the replaceable supply component, and a service identifier of the reprocessing service, and the instructions, when executed, cause the processor to further:

authenticate the replaceable supply component and authorize the replaceable supply component for reprocessing, using the supply identifier; and authenticate and authorize the reprocessing service to perform reprocessing using the service identifier.

12. The non-transitory computer-readable storage medium of claim 8, wherein the instructions to generate the configuration data, when executed, further cause the processor to:

identify an account associated with the replaceable supply component using a supply identifier; and generate the configuration data based on the account, the configuration data including data selected from:

an ejection mode, a service mode, a supply model, a supply attribute, and a combination thereof.

13. The non-transitory computer-readable storage medium of claim 8, wherein the cryptographically signed blob comprises a cryptographic envelope including a header and a payload, the payload comprises the configuration data, and the header comprises a description of cryptographic operations and parameters used to cryptographically sign the configuration data.

\* \* \* \* \*